April 6, 1965   C. J. SLAYMAN   3,177,271
METHOD OF MANUFACTURING A REFRIGERATOR CABINET
Filed Sept. 13, 1962
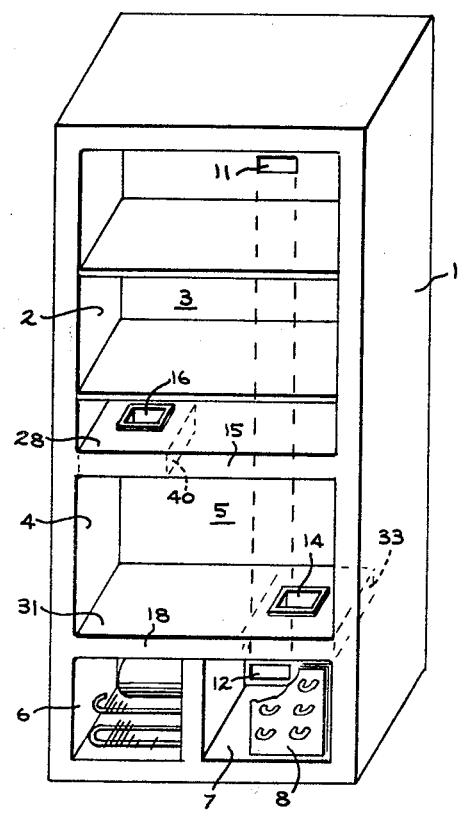
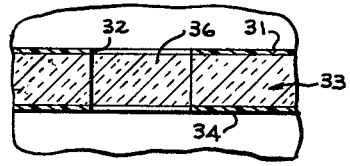
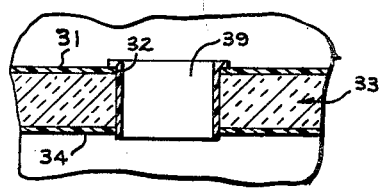
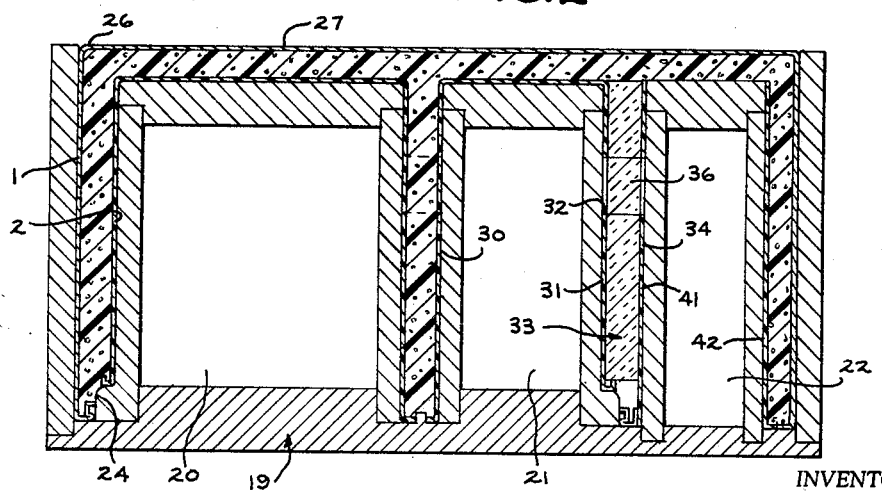
INVENTOR.
CHARLES J. SLAYMAN
BY *Walter E. Rule*
HIS ATTORNEY

United States Patent Office 3,177,271
Patented Apr. 6, 1965

3,177,271
METHOD OF MANUFACTURING A REFRIGERATOR CABINET
Charles J. Slayman, Louisville, Ky., assignor to General Electric Company, a corporation of New York
Filed Sept. 13, 1962, Ser. No. 223,313
2 Claims. (Cl. 264—45)

The present invention relates to resin foam insulated refrigerator cabinets and to a method of making such cabinets.

Certain types of foamed polyurethane resins have structural and insulating properties which make them particularly useful as insulation within the walls of refrigerator cabinets. In addition to their good heat insulating characteristics, these resin foams have excellent adhesion properties and good structural strength. Their heat insulating properties are further improved when the foams are generated or produced under pressure. In order to take full advantage of the mechanical properties of these foams, and to obtain the maximum heat insulating characteristics, it is desirable to form the foams in place within the walls of a refrigerator cabinet under moderate pressure conditions. Accordingly, the usual practice is to position the liner or liners within the outer case of a refrigerator cabinet and in spaced relationship with the case and with one another and to introduce the foamable liquid resin into the spaces between the caes and liners. As the case and liners form a closed mold, the resin is caused to foam and completely fill the mold under a moderate pressure generated by the expanding resin.

During the foaming process, it is necessary to provide suitable backing or supporting means for the relatively thin liner and case walls until the foam has set to a solid or rigid structure to prevent these walls from bowing under the pressure of the expanding resin.

Due to the fact that the liner and case walls have to be supported or backed during the foaming operation, and the additional fact that the liners and case must be arranged to form a closed mold so that foam cannot escape during the foam operation, the manufacture of foam insulated refrigerator cabinets which also include ducts or air passages interconnecting the various compartments presents a number of problems. The presence of the supporting means during the foaming operation, makes it difficult to install such ducts prior to the foaming operation. Also any ducts or conduits arranged to interconnect the compartments so that they are foamed in place during the foaming operation must be sufficiently strong to withstand the pressures of the foam and must be connected to the compartments in such a manner that foam cannot leak around or through the ducts and into the compartments.

The present invention has as its principal object the provision of a foam insulated cabinet including a simple and low cost means for providing a passage or passages interconnecting the various compartments.

Another object of the present invention is to provide simple, low cost means for blocking out foam insulation from those areas in which ducts are to be provided between spaced compartments in a foam insulated refrigerator cabinet.

Another object of the invention is to provide an improved method for manufacturing a foam insulated refrigerator cabinet including one or more ducts or air passages interconnecting adjacent compartments.

Further objects and advantages of the present invention will become apparent from the following description and the features of novelty which characterize the invention will be pointed out with particularity in the claims annexed to and forming a part of this specification.

In carrying out the objects of the present invention, there is provided a refrigerator cabinet including an outer case and means forming one or more compartments within the cabinet and spaced from one another and from the outer case. Except for the areas in which the air passages interconnecting the spaced compartments are provided, the entire cabinet is insulated by means of a resin foam insulation, such as a polyurethane foam. For the purpose of blocking the foam insulation from an area in which a duct is to be run between compartments, a semi-rigid block of glass wool insulation is provided in that area, the block having a thickness such that it exerts a pressure against the adjacent surfaces of the compartment forming means to prevent the flow of foam into the blocked area during the foaming process. Prior to positioning thereof in the cabinet structure, the block has a duct receiving opening cut therein but the material within the opening is left in place during the foaming operation to help resist the foaming pressure. The glass block is placed in the cabniet structure or between the compartment forming means with the precut opening registering with the opposed openings provided in the compartment forming means. After the foaming operation is complete, the material within the opening in the glass wool block is removed so that a permanent rigid duct can then be installed.

For a better understanding of the invention reference may be had to the accompanying drawing in which:

FIGURE 1 is a perspective view of a refrigerator cabinet, with the door or other closure members removed, illustrating one embodiment of the present invention;

FIGURE 2 is a sectional view of the cabinet of FIGURE 1 illustrating one step in the manufacture thereof, this view being taken generally along line 2—2 of FIGURE 1;

FIGURE 3 is an enlarged sectional view of a portion of the cabinet structure illlutsrating in greater detail one step in the manufacture of the foam insulated cabinet; and FIGURE 4 is a view similar to FIGURE 3 illustrating certain details of the final cabinet structure.

With reference to FIGURE 1 of the drawing, there is illustrated a refrigerator cabinet including an outer case 1, and compartment forming means including an upper liner 2 forming a fresh food storage compartment 3 and a lower liner 4 forming a freezer compartment 5 spaced from the case 1 and from one another. The fresh food compartment 3 is located in the upper portion of the cabinet while the freezer compartment 5 is located at the lower portion of the cabinet. Below the freezer compartment 5 and arranged in side-by-side relationship are a compressor and condenser compartment 6 and an evaporator compartment 7. The liners 2 and 4 and the walls defining the two compartments 6 and 7 are spaced from one another and from the outer case 1 and substantially all of these spaces are filled with a foamed resinous material such as a polyurethane foam. It will be understood that the access openings to the four compartments are closed by suitable doors or other closure means (not shown).

In the type of refrigerator cabinet illustrated in FIGURE 1, the compartment 6 is adapted to contain the compressor and condenser components, or in other words the high side components, of a refrigerating system while the evaporator compartment 7 is arranged to contain an evaporator 8 which serves to cool air streams circulated through the compartments 3 and 5. For this purpose there is provided an air flow or duct system by means of which air withdrawn from the compartments 3 and 5 by means of a fan (not shown) is passed over the evaporator 8 and the cooled air returned to the storage compartments 3 and 5. In the specific air flow system illustrated, a fan, positioned for example in the evaporator compartmnet 7, withdraws air from both of the compartments 3 and 5 through a duct 10 having a fresh food compartment inlet 11 and a freezer compartment inlet 12. This air is passed over the evaporator 8 and is then introduced into the freezer compartment 5 through a supply duct 14 in the partition 18 separating the freezer compartment 5 from the evaporator compartment 7. Most of the air supplied to the freezer compartment is withdrawn by the fan through duct inlet 12 and returns to the evaporator compartment. However, this duct is sized so that a portion of the air entering the freezer compartment is forced to flow upwardly through a duct 16 in the partition 15 separating the compartments 3 and 5 and into compartment 3. The amount of air flowing through the duct 16 is proportioned to maintain the fresh food compartment at the desired fresh food storage temperatures.

In accordance with one method of filling the spaces between the outer case and the liners with a foamed resin insulation, the liners 2 and 4 are arranged as shown in FIGURE 2 face down in a backing or supporting member which includes a first portion 20 for supporting the walls of the liner 2 and a second portion 21 for supporting the walls of the freezer liner 4. The backing member also includes a portion 22 for forming the evaporator compartment 7 and a similar portion (not shown) for forming at least part of the walls of the machinery or condensing unit compartment 6. Each of the portions of the backing member 19 include shoulders such as shoulder 24 for supporting the front edge of the liners. After the various means for forming the compartments are arranged on the various portions of the backing member 19, the outer case 1 is placed over the liners and the portions of the shoulders 24 serve to maintain the case 1 in spaced relationship with the adjacent surfaces of the liners and the means forming the evaporator and compressor-condenser compartments.

With the components of the cabinet so arranged a suitable foamable resin such as a polyurethane foam is introduced into the spaces between the outer case and the liners or other compartment means through a pour hole 26 provided in the back wall 27 of the outer case, the outer case and the liners 2 and 4 and the means forming the evaporator and compressor-condenser compartments 6 and 7 provide a closed mold in which the foamable resin is allowed to expand to entirely fill the hollow walls of the cabinet. During this expansion and after any air trapped in the mold has escaped, the pour hole 26 is closed in order that the maximum insulating properties of the foamed resin can be developed by carrying out the final expansion under a pressure generated by the expanding foam.

Since all of the walls of the liners 2 and 4, for example, are completely engaged by the respective portions 20 and 21 of the backing member 19, it will be seen that when the components of the cabinet are arranged for foaming, there is no way of obtaining access to these liners for the purpose of providing or assembling therewith ducts or other means defining the air passages 14 and 16 in the final cabinet. In accordance with the present invention, the provision of these ducts is accomplished by providing suitable duct openings in the liner prior to foaming and by blocking out foam insulation from the insulated spaces in the duct areas during the foaming of the resin employing blocks or slabs of semi-rigid glass wool insulation for that purpose.

For example, the required openings are provided in the lower wall 28 of the liner 2 and in the top wall 30 of the liner 4 before these liners are placed on the backing member 19. A similar opening 32 is provided in the bottom wall 31 of the liner 4 in order to provide the exit for the air passage 14.

After the liners have been placed on the backing member 19, blocks of glass fiber of the semi-rigid type are inserted at appropriate spots between the liners for the purpose of preventing foam insulation from entering these areas during the foaming operation. One such block indicated by the numeral 33 is indicated in FIGURE 2 as being placed between the bottom wall 31 of the compartment 5 and the opposed surface 34 of the portion 22 of the backing member. Prior to insertion of this glass fiber block, a portion thereof spaced from the edges of the block and approximately the size of the opening 32 provided in the bottom wall 31 of the freezer compartment liner 4 is cut out or completely separated from the remaining portion of the block 33. However, this portion 36 is not removed from the block 33 after being cut but is rather left in place in order to help the remaining portions of the block 33 resist the foam pressure on that block. After foaming and after the foam cabinet is removed from the supporting member 19, the portion 36 is removed and a suitable duct 39 as illustrated in FIGURE 4 is inserted through the opening 32, the duct 39 extending through the block of glass wool insulation 33 and opening into the evaporator compartment.

Similarly the glass wool block 40 is cut to provide a suitable opening therein but the material is not removed from that opening and the block 40 is placed between the upper and lower liners 2 and 4 to provide the passageway 16. After foaming the cut out material is removed and a duct inserted through the resultant opening.

The evaporator compartment 7 may or may not be formed by means of a liner corresponding to the liners 2 and 4, that is by a preformed structure including top, bottom, side and rear walls. In the illustrated embodiment of the invention, some of the walls of this compartment are formed of the foam plastic material. Other walls such as the top and bottom walls comprise sheets of metal or plastic material embedded in the foam. These sheets are shown as sheet 41 forming the top wall of the evaporator compartment, and a sheet 42 forming the bottom wall. The resin foam insulation completely surrounds and embeds the edges of the sheets during the foaming process while the sheets provide rigid wall surfaces. It will be understood that the sheet 41 forming the wall of the evaporator compartment 7 through which the duct 17 extends has a suitable duct receiving aperture cut therein prior to the placing thereof against the supporting surface of the backing member portion 22.

Preferably the glass wool block or blocks employed to define the air passages between the various compartment forming means and to act as barriers to the flow of foam into the areas adjacent the air passages during the foaming operation are of the semi-rigid type in which the individual glass fibers are adhesively secured together at their points of contact by means of a resinous material to provide a springy structure which nevertheless has good heat insulating properties. The blocks are preferably of a thickness slightly greater than the thickness of the final spaces between the liners or other compartment forming means or more specifically slightly thicker than the spaces provided when the liners or other compartment forming means are placed on the backing member 19 prior to foaming. When such glass wool blocks are inserted into the desired positions so that the openings therein match the openings in the liner walls to form the air passages between the compartments, the blocks will exert a pressure against the adjacent liner surfaces thereby forming a seal to prevent the foam from flowing into the areas in which the air passages are desired. If desired, the plastic sheet 41 forming the top wall of the evaporator compartment may first be adhesively secured to the glass fiber block 33 and this assembly placed in the proper position prior to the foaming operation.

While the invention has been described with reference to a particular embodiment thereof it will be understood that various modifications can be made therein and it is intended by the appended claims to cover all such modifications as come within the spirit and scope of the invention.

What I claim as new and desire to secure by Letters Patent of the United States is:

1. The method of manufacturing an insulated cabinet including an outer case and means forming spaced compartments within said cabinet insulated from one another but connected by an air duct, which method comprises positioning the compartment forming means within the outer case in spaced relaitonship with the case and with one another and with a block of glass fiber insulation in the space between said compartment forming means, said block including a removable plug extending through said block from one compartment forming means to the other and spaced from the peripheral edges of said block, introducing a foamable resin into the remaining spaces between said outer case and said compartment forming means to fill the remaining spaces with a foamed resin insulation, and thereafter removing said plug to provide a duct opening between the compartment forming means.

2. The method of manufacturing an insulated cabinet including an outer case and liners forming spaced compartments within said cabinet insulated from one another but connected by an air duct, which method comprises positioning the liners within the outer case in spaced relationship with the case and with one another with a block of glass fiber insulation in the space between said liners, said block including a removable plug extending through said block from one compartment forming means to the other and spaced from the peripheral edges of said block, said liners having openings registering with said plug, introducing a foamable resin into the remaining spaces between said outer case and said compartment forming means to fill the remaining spaces with a foamed resin insulation, and thereafter removing said plug to provide a duct opening between the compartment forming means.

References Cited by the Examiner
UNITED STATES PATENTS

| | | | |
|---|---|---|---|
| 1,807,332 | 5/31 | Abrahamson | 312—116 |
| 2,958,210 | 11/60 | Rill | 312—214 XR |
| 3,013,922 | 12/61 | Fisher | 312—214 XR |
| 3,037,652 | 6/62 | Wallace | 220—9 |
| 3,038,769 | 6/62 | Smith | 312—214 XR |
| 3,078,003 | 2/63 | Kesling | 312—214 XR |

ALEXANDER H. BRODMERKEL, *Primary Examiner.*

CHANCELLOR E. HARRIS, *Examiner.*